(12) United States Patent
Kwon et al.

(10) Patent No.: US 8,323,494 B2
(45) Date of Patent: Dec. 4, 2012

(54) SYSTEM AND METHOD FOR SEWAGE AND WASTEWATER TREATMENT

(75) Inventors: Joong Chun Kwon, Daejeon (KR); Yun Hak Kim, Daejeon (KR)

(73) Assignees: Ecodigm Co., Ltd., Daejeon (KR); Joong Chun Kwon, Daejeon (KR)

( * ) Notice: Subject to any disclaimer, the term of this patent is extended or adjusted under 35 U.S.C. 154(b) by 0 days.

(21) Appl. No.: 13/305,579

(22) Filed: Nov. 28, 2011

(65) Prior Publication Data
US 2012/0067800 A1 Mar. 22, 2012

Related U.S. Application Data

(63) Continuation of application No. PCT/KR2010/002009, filed on Apr. 1, 2010.

(30) Foreign Application Priority Data

May 27, 2009 (KR) .................. 10-2009-0046361

(51) Int. Cl.
*C02F 3/30* (2006.01)
(52) U.S. Cl. ............. 210/605; 210/623; 210/259
(58) Field of Classification Search .......... 210/605, 210/623, 252, 259
See application file for complete search history.

(56) References Cited

U.S. PATENT DOCUMENTS

| | | | | |
|---|---|---|---|---|
| 4,253,947 A * | 3/1981 | Fan et al. | ...... | 210/610 |
| 4,650,585 A * | 3/1987 | Hong et al. | ...... | 210/605 |
| 6,352,643 B1 | 3/2002 | Kwon et al. | | |
| 7,311,833 B2 * | 12/2007 | Yamamoto et al. | ...... | 210/603 |
| 2004/0045900 A1* | 3/2004 | Nam et al. | ...... | 210/620 |
| 2004/0206700 A1* | 10/2004 | Kim et al. | ...... | 210/605 |
| 2006/0163156 A1* | 7/2006 | Eto | ...... | 210/605 |
| 2007/0267345 A1* | 11/2007 | Tsutsumi et al. | ...... | 210/605 |
| 2009/0001016 A1* | 1/2009 | Lee | ...... | 210/605 |

FOREIGN PATENT DOCUMENTS

| | | | |
|---|---|---|---|
| JP | 59-150597 A * | 8/1984 | |
| KR | 10-2000-0031978 A | 6/2000 | |
| KR | 10-2003-0009677 A | 2/2003 | |
| KR | 10-2005-0081251 A | 8/2005 | |
| KR | 10-2009-0027077 A | 3/2009 | |

* cited by examiner

*Primary Examiner* — Fred Prince

(74) *Attorney, Agent, or Firm* — Edwards Wildman Palmer LLP

(57) ABSTRACT

The present invention relates to a sewage/wastewater treatment system comprising a rectangular upflow anaerobic/oxygen-free reaction tank and a method of treating sewage/wastewater using the same. The rectangular upflow anaerobic/oxygen-free reaction tank comprises a water introducing unit, an inlet unit being in fluid communication with the water introducing unit and having a plurality of through-holes formed therein through which water introduced from the water introducing unit can pass, a mixing unit comprising a main shaft and a plurality of spaced-apart stirring blades fixed to the main shaft, and an outlet unit for collecting water after being treated in the anaerobic/oxygen-free reaction tank. The system and method can treat sewage/wastewater cost-effectively.

14 Claims, 5 Drawing Sheets

SYSTEM AND METHOD FOR SEWAGE AND WASTEWATER TREATMENT

CROSS-REFERENCES TO RELATED APPLICATION

This is a continuation of International Application No. PCT/KR2010/002009, with an international filing date of Apr. 1, 2010, which claims the benefit of Korean Application No. 10-2009-46361 filed on May 27, 2009, the entire contents of which applications are incorporated herein by reference.

BACKGROUND OF THE DISCLOSURE

1. Technical Field

The present disclosure relates to a system and method for sewage/wastewater treatment that can treat sewage/wastewater in a cost-effective way.

2. Related Art

Generally, wastewater contains nutritional substances such as nitrogen or phosphorus, sparingly soluble and toxic substances, and heavy metals. Such wastewater can be treated by a biological method or a physical/chemical method.

Typical examples of the biological wastewater treatment method include an activated sludge method employing a treatment system including a first settling tank, an aeration tank, and a final settling tank, and a sewage/wastewater treatment method employing an aerobic/anaerobic process. However, the former method requires a means for maintaining the concentration of sludge at a specific level or higher, and the latter method does not use the activated sludge process alone, but adopts a complete mixing mode in which an aerobic reaction tank and an anaerobic/oxygen-free reaction tank which are arranged in a line are operated. Thus, in the latter method, there are problems in that it is difficult to maintain microorganisms in the reaction tanks at a high concentration and in that it is difficult to maintain a complete anaerobic state during denitrification or the induction of phosphorus discharge.

Previously, the present inventors developed a sewage/wastewater treatment system and method for treating organic wastewater containing sparingly soluble and toxic substances, nutritional substances such as nitrogen or phosphorus, and heavy metals, as disclosed in Korean Patent No. 10-0287412 issued Jan. 27, 2001. The sewage/wastewater treatment system comprises a mixing unit combined with a cylindrical anaerobic/oxygen-free reaction tank. Thus, the wastewater treatment system may not be applied without modification to a conventional sewage/wastewater treatment system including a first settling tank, a reaction tank, and a final settling tank. That is, the first settling tank is required to be modified to serve as an anaerobic/oxygen-free reaction tank and the modified first settling tank is then required to be operated in combination with the existing reaction tank and final settling tank. Also, in applying the sewage/wastewater treatment method to a sewage/wastewater treatment system having a rectangular first settling tank, a new cylindrical anaerobic/oxygen-free reaction tank is required in place of the first rectangular settling tank such that the new tank can be operated in combination with the existing reaction tank and final settling tank, thereby requiring excessive equipment investment.

Accordingly, there is a need to develop a new sewage/wastewater treatment system and method.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

An object of the present invention is to provide a sewage/wastewater treatment system for treating organic wastewater containing sparingly soluble or toxic substances, or nutritional substances (nitrogen or phosphorus) and heavy metals, which comprises a rectangular upflow anaerobic/oxygen-free reaction tank including at least one mixing unit and an improved inlet unit and outlet, in which the rectangular upflow anaerobic/oxygen-free reaction tank is combined with a conventional aerobic reaction tank and settling tank, whereby the sewage/wastewater treatment system can purify wastewater at a significantly high efficiency.

Another object is to provide a sewage/wastewater treatment method using the system.

In one aspect, the present invention provides a sewage/wastewater treatment system comprising an anaerobic/oxygen-free reaction tank, an aerobic reaction tank and a settling tank, wherein the anaerobic/oxygen-free reaction tank comprises: a water introducing unit; an inlet unit being in fluid communication with the water introducing unit and having a plurality of through-holes formed therein through which water introduced from the water introducing unit can pass; a mixing unit comprising a main shaft and a plurality of spaced-apart stirring blades fixed to the main shaft; and an outlet unit for collecting water after being treated in the anaerobic/oxygen-free reaction tank.

In another aspect, the present invention provides a method of treating sewage/wastewater using the above-described sewage/wastewater treatment system. The method comprises the steps of introducing water into the anaerobic/oxygen-free reaction tank through the water introducing unit and the inlet unit; stirring the content of the anaerobic/oxygen-free reaction tank while the introduced water is anaerobically treated; transferring the anaerobically treated water from the anaerobic/oxygen-free reaction tank through the outlet unit into the aerobic reaction tank; supplying a sufficient amount of oxygen to the anaerobically treated water in the aerobic reaction tank to aerobically treat the water; and transferring the aerobically treated water into the settling tank, separating the transferred water into supernatant water and settled sludge, and discharging the supernatant water and the sludge.

The above and other objects and aspects will be discussed in detail below.

DETAILED DESCRIPTION OF EMBODIMENTS

Figure 1:
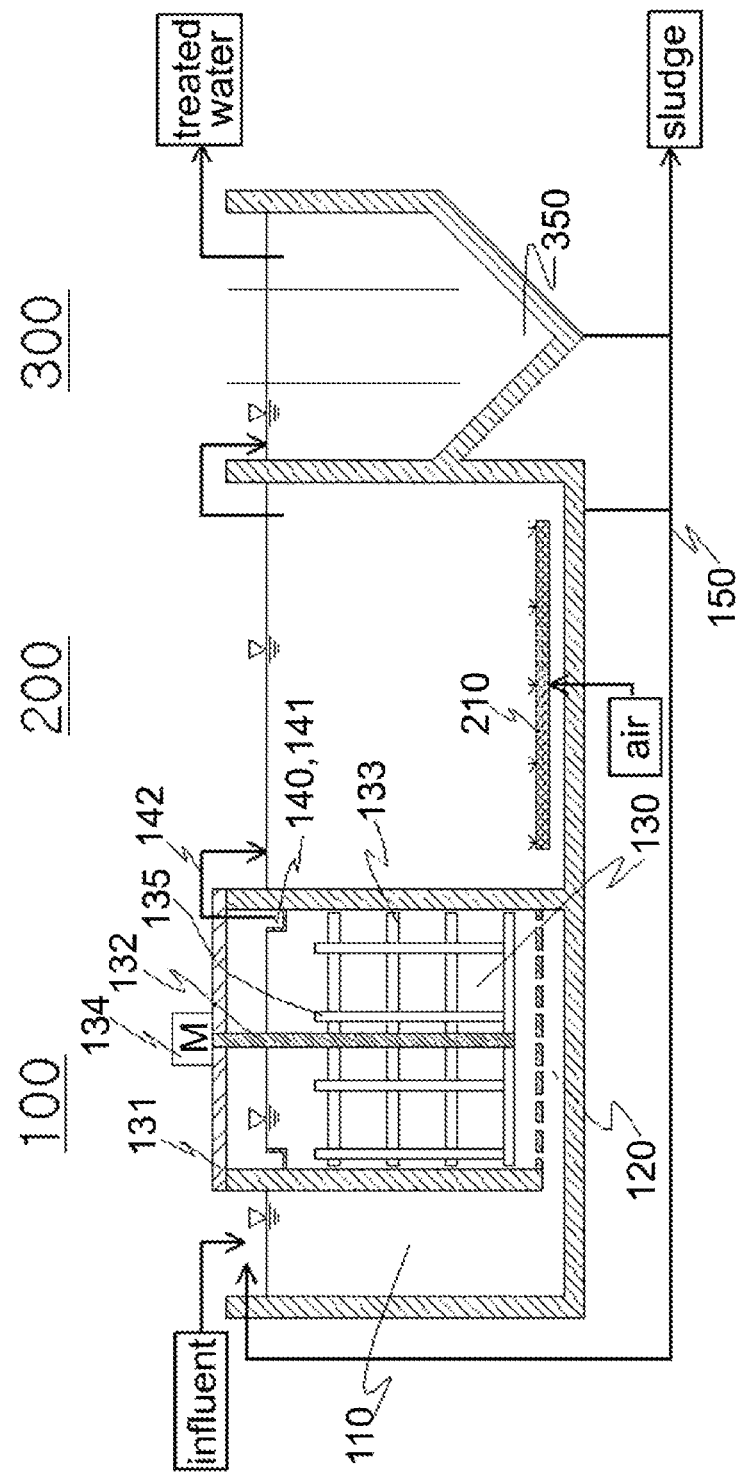
FIG. 1 is a top view of a sewage/wastewater treatment system according to an embodiment of the present invention.

Hereinafter reference will now be made in detail to various embodiments of the present invention. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

1. Sewage/wastewater Treatment System

As discussed above, one aspect of the present invention provides a sewage/wastewater treatment system. The system comprises an anaerobic/oxygen-free reaction tank, an aerobic reaction tank, and a settling tank. The anaerobic/oxygen-free reaction tank comprises a water introducing unit, an inlet unit being in fluid communication with the water introducing unit and having a plurality of through holes formed therein through which water introduced from the water introducing unit can pass, a mixing unit comprising a main shaft and a plurality of spaced-apart stirring blades fixed to the main shaft, and an outlet unit for collecting water after being treated in the anaerobic/oxygen-free reaction tank.

The water introducing unit may, suitably, be realized by one or more pipes, one or more spaces, a combination thereof. Water and recycled sludge and others can be introduced through the water introducing unit. In some cases, a separate unit (not shown; for example, a stirring blade and a driving motor) for mixing the introduced materials uniformly may be provided at a predetermined position or positions.

The inlet unit may, suitably, be realized by one or more plates, one or more tubes, or a combination thereof. The plates or tubes are in fluid communication with the water introducing unit. Preferably, the plates and tubes each may have a plurality of through-holes formed therein. The plates and tubes may be disposed horizontally and/or vertically at predetermined positions. For example, the inlet unit may be a flat plate having a plurality of through-holes formed therein, or one or a plurality of main tubes having a plurality of through-holes formed therein, or one or a plurality of main tubes having a plurality of through-holes formed therein and a plurality of auxiliary tubes communicating with the main tubes and having a plurality of through-holes, or a plurality of tubes the ends of which are distributed uniformly at the bottom of the mixing unit. Preferably, the inlet unit may be disposed at a lower portion of the anaerobic/oxygen-free reaction tank such that the introduced materials (e.g., water to be treated or recycled sludge-containing water) can be spread uniformly throughout the anaerobic/oxygen-free reaction tank (mixing unit).

In the mixing unit, the main shaft to which the stirring blades are attached is coupled to a support frame, such that materials introduced into the anaerobic/oxygen-free reaction tank can be stirred by the rotation of the stirring blades. With the rotation, an anaerobic reaction by microorganisms under anaerobic conditions actively occurs to efficiently purify organic wastewater containing sparingly soluble and toxic substances and nutritional substances and heavy metals. At least one auxiliary shaft may be disposed, if desired. The number and structure of the main shaft and the auxiliary shafts, which are coupled to the support flame, can be determined according to, e.g., the size of the anaerobic/oxygen-free reaction tank. The mixing unit may preferably further comprise a driving unit that can provide driving force to rotate the main shaft(s) and/or auxiliary shaft(s).

The outlet unit may preferably comprise a weir and may, if necessary, further comprise a separate transfer tube. The weir functions to collect the water, which has been treated in the anaerobic/oxygen-free reaction tank. Preferably, it may be provided on the inner wall of the anaerobic/oxygen-free reaction tank or be disposed so as to connect the opposite walls of the reaction tanks to each other, such that it can collect the treated water (and a portion of the sludge).

In certain embodiments, a sludge collection unit may be provided in the anaerobic/oxygen-free reaction tank in order to remove at least a portion of the sludge contained in the anaerobic/oxygen-free reaction tank. Specifically, the bottom of the anaerobic/oxygen-free reaction tank may be formed to be inclined such that the sludge collected at the bottom of anaerobic/oxygen-free reaction tank can be discharged. Alternatively, a scraper may be disposed adjacent to the bottom of the anaerobic/oxygen-free reaction tank such that sludge can be collected and discharged by the scraper.

In certain embodiments, the sewage/wastewater treatment system may comprise one or more anaerobic/oxygen-free reaction tanks and/or one or more aerobic reaction tanks. In this case, the anaerobic/oxygen-free reaction tanks can be connected directly with each other. Also, the aerobic reaction tanks can be connected directed with each other. In addition, the anaerobic/oxygen-free reaction tanks are connected with the aerobic reaction tanks alternately.

In certain embodiments, to increase the operation performance of the system, a suitable amount of activated sludge may be additionally introduced into the anaerobic/oxygen-free reaction tank.

In certain embodiments, the system may further comprise a recycle pipe for transferring sludge from the settling tank into the anaerobic/oxygen-free reaction tank. One end of the recycle pipe may be connected to the bottom of the settling tank, and the other end of the recycle pipe may be connected to the water introducing unit or to the anaerobic/oxygen-free reaction tank. In some embodiments where the recycle unit is provided in the anaerobic/oxygen-free reaction tank, the recycle unit may be connected directly to the recycle unit. In some other embodiments whree it is not provided in the anaerobic/oxygen-free reaction tank, the recycle pipe may be connected to the water introducing unit such that the recycled sludge is mixed with water in the water introducing unit and supplied to the anaerobic/oxygen-free reaction tank. The recycle unit serves to spread the recycled sludge uniformly into the anaerobic/oxygen-free reaction tank and may have a structure in which a plurality of tubes are connected to form a lattice and a plurality of through-holes are formed at the upper portion of the tubes. In some embodiments, the recycle unit may have a structure equal or similar to the above-described inlet unit and may be provided in the anaerobic/oxygen-free reaction tank or may be the inlet unit itself.

2. Sewage/wastewater Treatment Method

Another aspect of the present invention provides a sewage/wastewater treatment method using the above-described sewage/wastewater treatment system. The method comprises the steps of introducing water into the anaerobic/oxygen-free reaction tank through the water introducing unit and the inlet unit; stirring the content of the anaerobic/oxygen-free reaction tank while the introduced water is anaerobically treated; transferring the anaerobically treated water from the anaerobic/oxygen-free reaction tank through the outlet unit into the aerobic reaction tank; supplying a sufficient amount of oxygen to the anaerobically treated water in the aerobic reaction tank to aerobically treat the water; and transferring the aerobically treated water into the settling tank, separating the transferred water into supernatant water and settled sludge, and discharging the supernatant water and the sludge.

To maintain the concentration of sludge in the anaerobic/oxygen-free reaction tank at a particular level or higher, the method may further comprise a step of recycling at least a portion of the sludge from the settling tank directly or indirectly into the anaerobic/oxygen-free reaction tank through the recycle pipe.

With the sewage/wastewater treatment systems and methods, organic wastewater containing sparingly and toxic substances, or nutritional substances (such as nitrogen or phosphorus) and heavy metals can be biologically treated in a cost-effective way. In addition, a high concentration of sludge can be maintained in the reaction tanks, so that the volume and/or number of the reaction tanks can be reduced compared to that of prior art systems. Additionally, as the systems and methods can be applied to existing rectangular sewage/wastewater treatment systems, land costs, construction costs and operation costs can be significantly saved.

EXAMPLES

Hereinafter, the present invention will be described in further detail with the accompanying drawings. However, these drawings and the description thereof are intended to illustrate rather than limit the technical idea and scope of the present invention. It will be obvious to those skilled in the art that various modifications are possible within the scope of the technical idea of the present invention. For example, the drawings show that an anaerobic/oxygen-free reaction tank, an aerobic reaction tank and a settling tank are disposed adjacent to each other, but it will be obvious that the position, specification and configuration of these tanks may be modified in various manners.

1. Sewage/wastewater Treatment System

In one aspect, the present invention provides a sewage/wastewater treatment system. FIG. 1 shows a sewage/wastewater treatment system according to an embodiment of the present invention. The system comprises an anaerobic/oxygen-free reaction tank 100, an aerobic reaction tank 200, and a settling tank 300.

The anaerobic/oxygen-free reaction tank 100 comprises a water introducing unit 110, an inlet unit 120, a mixing unit 130, and an outlet unit 140. The water introducing unit 110 is provided to introduce wastewater into the anaerobic/oxygen-free reaction tank 100. The water introducing unit 110 may be realized by a space defined inside the anaerobic/oxygen-free reaction tank 100, as shown in FIG. 1. However, it may be realized in different ways. For example, it may be realized by a pipe(s) connected to the anaerobic/oxygen-free reaction tank 100, although not shown.

Figure 2:
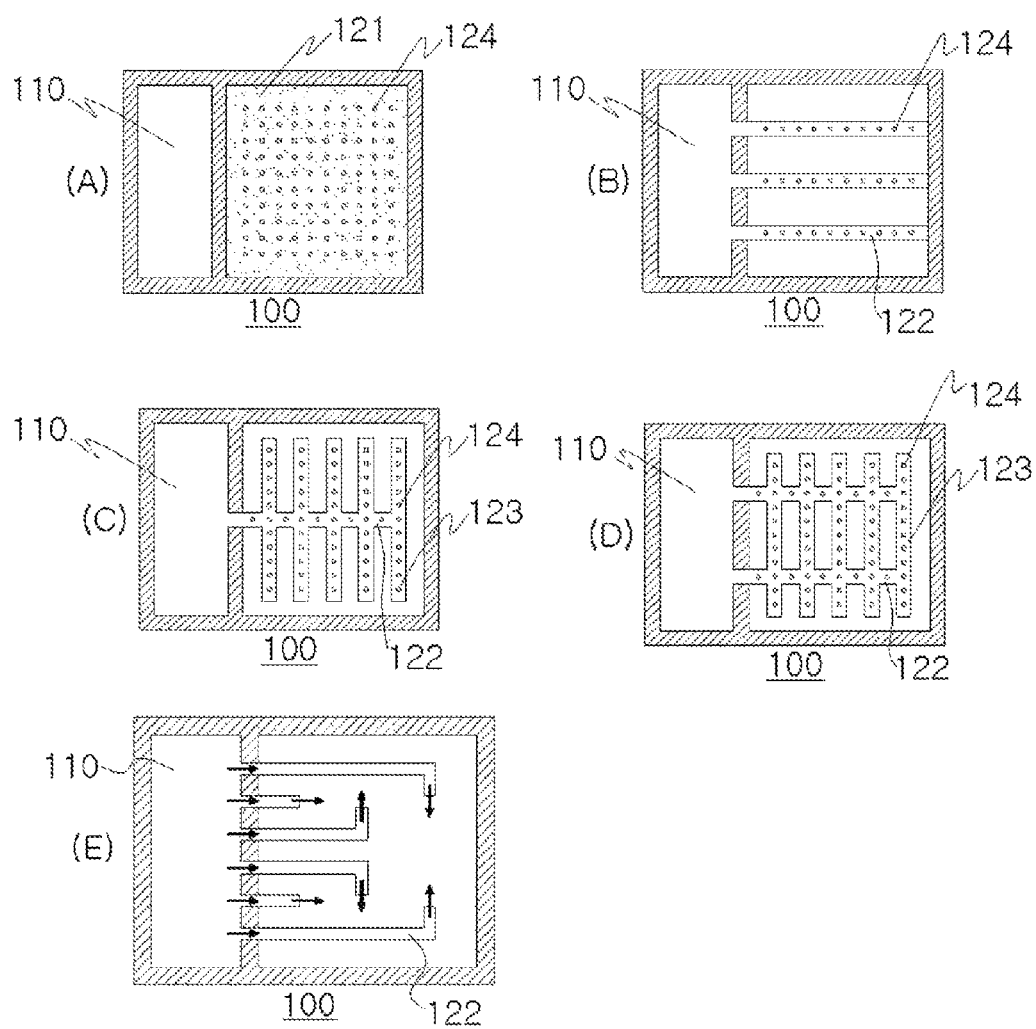
FIG. 2 show examples of an inlet unit of the sewage/wastewater treatment system of FIG. 1.

The inlet unit 120 is connected to the water introducing unit 110 for dispersing the introduced water uniformly in the anaerobic/oxygen-free tank 100. The inlet unit 120 may have various structures allowing the introduced water to be dispersed uniformly throughout the horizontal surface of the anaerobic/oxygen-free reaction tank 100. For example, as shown in FIG. 2, the inlet unit 124 may comprise a flat plate(s) having a plurality of holes 124 formed therethrough (FIG. 2A), or a main tube(s) 122 having a plurality of holes 124 formed therethrough (FIG. 2B), or a main tube(s) 122 having a plurality of holes 124 formed therethrough and a plurality of auxiliary tubes 123 communicating with the main tube(s) 122 and having a plurality of holes 124 (FIGS. 2C and D), or a tube(s) the ends of which are distributed uniformly at the bottom of the mixing unit 130 (FIG. 2E).

The mixing unit 130 is provided to stir the introduced water and sludge. The mixing unit 130 may, preferably, comprise a support frame 131 and a main shaft 132 rotatably coupled to the support frame 131. A plurality of stirring blades (e.g., 3-6 stirring blades) may be connected to the main shaft 132. If necessary, a plurality of auxiliary shafts 135 may be disposed such that they are spaced apart from the main shaft 132.

The stirring blades 133 serve to stir large amounts of anaerobic microorganisms present in the introduced water and the sludge and are coupled to the main shaft 132 such that they are spaced apart from each other at a predetermined interval(s) (e.g., about 0.5-1 m), whereby the upper and lower parts of the anaerobic/oxygen-free reaction tank 100 are uniformly stirred to increase the area of contact between the introduced water and the anaerobic microorganisms, thereby promoting the anaerobic reaction.

Figure 3:
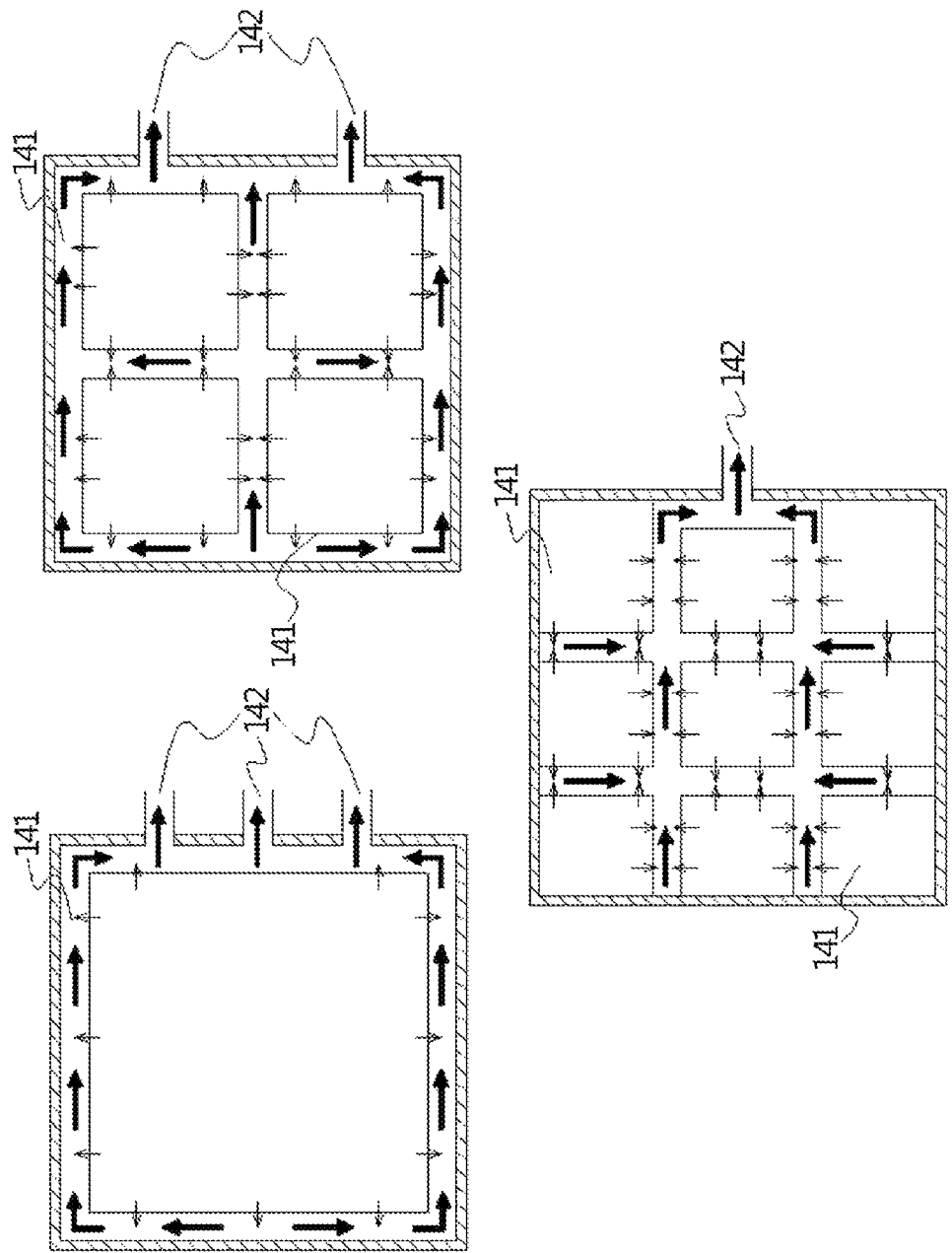
FIG. 3 show examples of an outlet unit of the sewage/wastewater treatment system of FIG. 1.

The outlet unit 140 is provided to transfer the treated water to the aerobic reaction tank 200. The outlet unit 140 may, preferably, comprise a weir 141 for collecting the treated water, and a transfer pipe 142 for transferring the treated water into the aerobic reaction tank 200. As shown in FIG. 1, the outlet unit 140 may be provided on the inner wall of the anaerobic/oxygen-free reaction tank 100. The outlet unit 140, however, may be provided in various structures. For example, as shown in FIG. 3, it may be provided in various structures at an upper portion of the anaerobic/oxygen-free reaction tank 100. The configuration of the weir 141 and the number and position of the transfer pipes 142 may be suitably determined by a person skilled in the art depending on, e.g., design needs.

In certain embodiments, a sludge collection unit (not shown) may be provided at the bottom of the anaerobic/oxygen-free reaction tank 100. The sludge collection unit serves to collect excessively settled sludge and discharge the collected sludge to the outside.

The aerobic reaction tank 200 may, preferably, comprise an aeration tube 210 at the bottom for supplying a sufficient amount of oxygen such that facultative microorganisms can exhibit sufficient activity. The material and structure of the aerobic reaction tank 200 are not limited to particular ones. For instance, aerobic reaction tanks that are or are to be known or available in the art may be used.

The settling tank 300 serves to remove the sludge that has been efficiently decomposed by facultative microorganisms in the treated water. It may be a gravity-type settling tank which can remove the sludge slowly by gravity to purify wastewater and obtain pure water. Also, it may be a settling tank having a scum-preventing plate therein. The sludge settled in the settling tank is collected and discharged by a sludge collection unit 350.

In certain embodiments, a unit for recycling the sludge settled in the settling tank may additionally be provided. In other words, at least a portion of the sludge collected by the sludge collection unit 350 in the settling tank 300 is recycled into the reaction tank 100 through a recycle pipe 150. The recycled sludge may also be introduced into the water introducing unit 110 or the anaerobic/oxygen-free reaction tank 100, such that it can be mixed with the introduced water.

Recycling the sludge containing microorganisms can promote the reaction in the anaerobic/oxygen-free reaction tank 100. If sludge is excessively introduced or produced in the anaerobic/oxygen-free reaction tank 100, the excess portion of the sludge can be discharged to the outside using the sludge collection unit 350.

Figure 4:
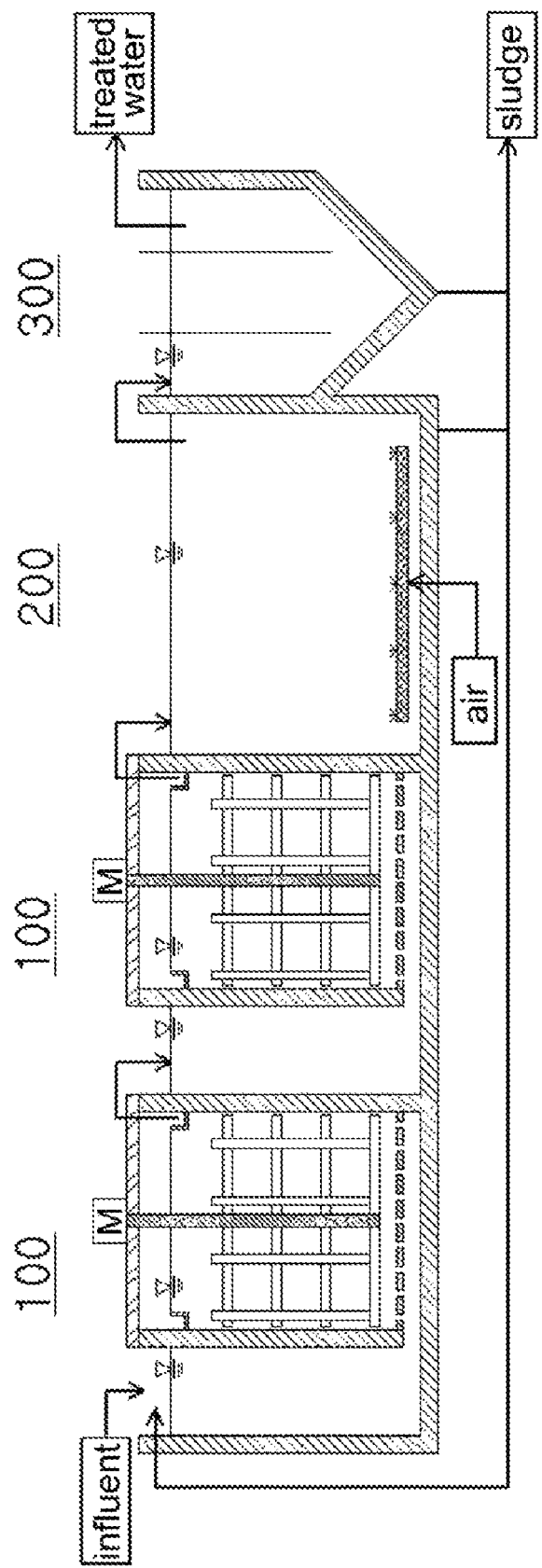
FIG. 4 is a top view of a sewage/wastewater treatment system according to another embodiment of the present invention.
Figure 5:
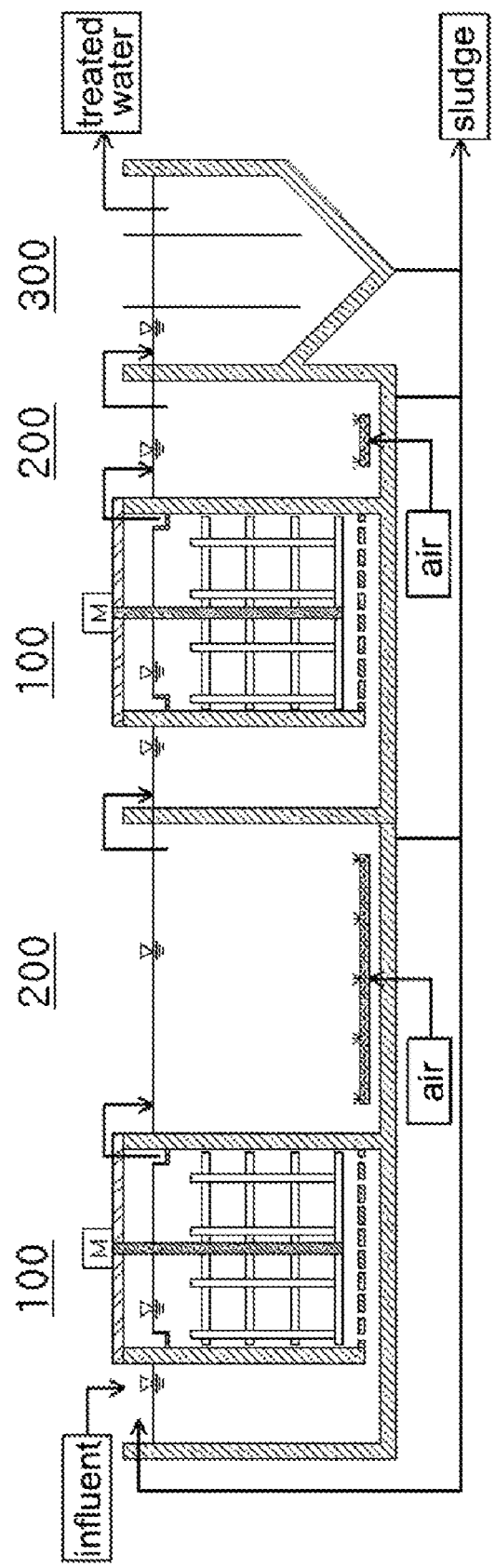
FIG. 5 is a top view of a sewage/wastewater treatment system according to still another embodiment of the present invention.

The number of the anaerobic/oxygen-free reaction tank 100, the aerobic reaction tank 200, and the settling tank 300 and the order thereof can be determined appropriately. For example, a sewage/wastewater treatment system according to certain embodiments may comprise a plurality of the anaerobic/oxygen-free reaction tanks 100, a plurality of the aerobic reaction tanks 200, and a plurality of the settling tanks 300 in various orders. For example, as shown in FIG. 4, two anaerobic/oxygen-free reaction tanks 100 may be connected directly with each other (that is, anaerobic/oxygen-free reaction tank→anaerobic/oxygen-free reaction tank→aerobic tank→settling tank), and as shown in FIG. 5, two anaerobic/oxygen-free reaction tanks 100 and two aerobic reaction tanks 200 may be connected alternately with each other (that is, anaerobic/oxygen-free reaction tank→aerobic reaction tank→anaerobic/oxygen-free reaction tank→aerobic tank→settling tank). Such various configurations may be suitably selected depending on the overall structure and scale of the sewage/wastewater treatment system, the properties of wastewater to be treated, etc.

As described above, the sewage/wastewater treatment systems according to the embodiments of the present invention have advantages in that organic wastewater containing sparingly soluble and toxic substances and nutrients (N or P) is treated using facultative microorganisms and the (rectangular upflow) anaerobic/oxygen-free reaction tank, thereby more efficiently treating wastewater compared to the conventional sewage/wastewater systems.

2. Sewage/Wastewater Treatment Method

As discussed above, in another aspect, the present invention provides a method of treating sewage/wastewater using the above-described sewage/wastewater treatment systems. Hereinafter, each step of the method will be described in detail.

Introduction step: Introduction of Water into Anaerobic/Oxygen-Free Reaction Tank Wastewater containing sparingly soluble and toxic substances and nutritional substances (N, P) is directed toward the anaerobic/oxygen-free reaction tank 100 by the water introducing unit 110 provided under the anaerobic/oxygen-free reaction tank 100 and is then introduced into the anaerobic/oxygen-free reaction tank 100 through the inlet unit 120 connected with the water introducing unit 110.

Anaerobic Treatment Step: Fermentation in Anaerobic/Oxygen-Free Reaction Tank

In order to more efficiently purify the water introduced into the anaerobic/oxygen-free reaction tank 100 as described above, activated sludge is introduced into the anaerobic/oxygen-fire reaction tank 100. Then, the content of the mixing section of the anaerobic/oxygen-free reaction tank 100 is continuously stirred at a predetermined speed (e.g., 3-20 rpm) to induce a sufficient anaerobic reaction.

This stirring can prevent the short circuiting of the introduced sludge/organic wastewater mixture that may otherwise be caused by an increase in the sludge concentration when the mixture in the anaerobic/oxygen-free reaction tank 100 flows upward while it undergoes an anaerobic reaction. If the stirring speed in the mixing unit is too low, the short circuiting may occur so that no sufficient reaction will occur, and if it is too high, complete mixing may occur such that the advantage of the plug flow reactor cannot be used.

Transfer Step: Transfer into Aerobic Reaction Tank

At least a portion of the sludge settled through the above process is collected in a sludge collection unit placed at the bottom of the anaerobic/oxygen-five reaction tank 100 and is then discharged by a sludge discharge pump. Meanwhile, at least a portion of the sludge-contained treated water that flows upward is transferred from the anaerobic/oxygen-free reaction tank 100 into the aerobic reaction tank 200 through the outlet unit 140 (weir) located at the upper portion of the anaerobic/oxygen-free reaction tank 100.

Aerobic Treatment Step: Aeration in Aerobic Reaction Tank

To the sludge-containing treated water transferred from the anaerobic/oxygen-free reaction tank 100, a sufficient amount of oxygen is supplied through the aeration tube 210. Then, the activity of aerobic or facultative microorganisms in the sludge increases so that various organic substances in the wastewater are decomposed by oxidation into inorganic substances such as $H_2O$ or $CO_2$, and ammonia nitrogen and organic nitrogen are converted into nitrate nitrogen, and the microorganisms in the sludge take an excess of phosphorus.

In this step, in order to more efficiently purify the organic wastewater containing sparingly soluble and toxic substances and nutritional substances (N, P), a portion of the treated water which has been subjected to the aeration process in the aerobic reaction tank 200 may be recycled into the anaerobic/oxygen-free reaction tank 100.

Separation and Discharge Step: Separation, Discharge and Sludge Recycle

The treated water which has been subjected to the aeration process is transferred into the settling tank 300 from which pure water is separated and discharged, and the sludge settled (e.g., by gravity) is collected in the sludge collection unit 350 at the bottom of the final settling tank and is discharged.

The sludge collected in the sludge collection unit is recycled by a sludge recycle pump either into the water introducing unit 110 or into a recycle unit disposed within the anaerobic/oxygen-free reaction tank 100 to promote the reaction in the anaerobic/oxygen-free reaction tank 100. An excess portion of the sludge in the anaerobic/oxygen-free reaction tank 100 is collected in the sludge collection unit disposed in the anaerobic/oxygen-free reaction tank 100 and is then discharged to the outside through a sludge reduction unit such as a sludge digestive unit or a dehydrating unit.

Various microorganisms can be used in the systems and methods for sewage/wastewater treatment according to the present invention. Examples of the microorganisms may include, but not limited to, *Nitrosomonas, Nitrobacter, Denitnfier*, Sulfate reducing bacteria, *Pseudomonas, Achromobacter, Aerhorbacter, Micrococcus, Bacillus, Proteus, Flavobacterium, Acinetobacter, Corynebacterium* or *Mycobacterium*, as well as commercially available various facultative microorganisms.

As described above, the systems and methods of the present invention can economically biologically treat organic wastewater containing sparingly soluble and toxic substances, or nutrients, such as nitrogen or phosphorus, and heavy metals. Further, the systems and method can be applied to existing rectangular sewage/wastewater treatment systems.

Although the embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A sewage/wastewater treatment system comprising an anaerobic reaction tank, an aerobic reaction tank and a settling tank, wherein the anaerobic reaction tank comprises:
   a water introducing unit;
   an inlet unit being in fluid communication with the water introducing unit and having a plurality of through-holes formed therein through which water introduced from the water introducing unit can pass;
   a mixing unit comprising a main shaft and a plurality of spaced-apart stirring blades fixed to the main shaft; and
   an outlet unit for collecting water after being treated in the anaerobic reaction tank,
   wherein the inlet unit is provided between the water introducing unit and the mixing unit.

2. The sewage/wastewater treatment system of claim 1, further comprising one or more of additional anaerobic reaction tanks, at least one or more of additional aerobic reaction tanks, or both.

3. The sewage/wastewater treatment system of claim 2, wherein the water inlet unit is realized by one or more spaces or one or more pipes.

4. The sewage/wastewater treatment system of claim 2, further comprising a recycle pipe for recycling sludge from the settling tank into the anaerobic reaction tank.

5. The sewage/wastewater treatment system of claim 1, wherein the water inlet unit is realized by one or more spaces or one or more pipes.

6. The sewage/wastewater treatment system of claim 1, further comprising a recycle pipe for recycling sludge from the settling tank into the anaerobic reaction tank.

7. A method of treating sewage/wastewater using the sewage/wastewater treatment system of claim 1, the method comprising the steps of:
introducing water into the anaerobic reaction tank through the water introducing unit and the inlet unit;
stirring the content of the anaerobic reaction tank while the introduced water is anaerobically treated;
transferring the anaerobically treated water from the anaerobic reaction tank through the outlet unit into the aerobic reaction tank;
supplying a sufficient amount of oxygen to the anaerobically treated water in the aerobic reaction tank to aerobically treat the water; and
transferring the aerobically treated water into the settling tank, separating the transferred water into supernatant water and settled sludge, and discharging the supernatant water and the sludge.

8. The method of treating sewage/wastewater of claim 7, wherein the sewage/wastewater treatment system further comprises one or more of additional anaerobic reaction tanks, at least one or more of additional aerobic reaction tanks, or both.

9. A method of treating sewage/wastewater using the sewage/wastewater treatment system of claim 7, the method comprising the steps of:
introducing water into the anaerobic reaction tank through the water introducing unit and the inlet unit, while recycling a portion of sludge from the settling tank into the anaerobic reaction tank through the recycle pipe;
stirring the content of the anaerobic reaction tank while the introduced water is anaerobically treated;
transferring the anaerobically treated water from the anaerobic reaction tank through the outlet unit into the aerobic reaction tank;
supplying a sufficient amount of oxygen to the anaerobically treated water in the aerobic reaction tank to aerobically treat the water; and
transferring the aerobically treated water into the settling tank, separating the transferred water into supernatant water and settled sludge, and discharging the supernatant water and the sludge.

10. The method of treating sewage/wastewater of claim 9, wherein the sewage/wastewater treatment system further comprises one or more of additional anaerobic reaction tanks, at least one or more of additional aerobic reaction tanks, or both.

11. The method of claim 7, wherein the content of the anaerobic reaction tank is continuously stirred.

12. The method of claim 7, wherein the content of the anaerobic reaction tank is continuously stirred such that the reactor operates as a plug flow reactor.

13. The sewage/wastewater treatment system of claim 1, wherein the plurality of stirring blades are spaced apart from each other at predetermined intervals so as to uniformly stir upper and lower parts of the anaerobic reaction tank.

14. The sewage/wastewater treatment system of claim 1, wherein the main shaft and a plurality of spaced-apart stirring blades are configured and arranged so as to provide a plug flow reaction.

* * * * *